US009497494B1

(12) United States Patent
Sun et al.

(10) Patent No.: US 9,497,494 B1
(45) Date of Patent: Nov. 15, 2016

(54) BROADCAST SERVICE CHANNEL OPTIMIZATION FOR TV SERVICES

(75) Inventors: Yaojun Sun, South Riding, VA (US); Zheng Cai, Fairfax, VA (US); Jing Qu, Reston, VA (US); Arun Manroa, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 2049 days.

(21) Appl. No.: 12/040,532

(22) Filed: Feb. 29, 2008

(51) Int. Cl.
| H04N 21/2385 | (2011.01) |
| H04N 21/647 | (2011.01) |
| H04N 21/24 | (2011.01) |
| H04N 21/61 | (2011.01) |
| H04W 28/02 | (2009.01) |

(52) U.S. Cl.
CPC ...... *H04N 21/2385* (2013.01); *H04N 21/2402* (2013.01); *H04N 21/6131* (2013.01); *H04N 21/64723* (2013.01); *H04N 21/64738* (2013.01); *H04W 28/0289* (2013.01)

(58) Field of Classification Search
None
See application file for complete search history.

(56) References Cited

U.S. PATENT DOCUMENTS

| 5,461,611 | A * | 10/1995 | Drake et al. ............... 370/420 |
| 6,275,496 | B1 * | 8/2001 | Burns et al. .............. 370/429 |
| 6,304,894 | B1 * | 10/2001 | Nakayama et al. ......... 709/203 |
| 6,360,103 | B2 * | 3/2002 | Veerasamy ................ 455/512 |
| 6,615,166 | B1 * | 9/2003 | Guheen et al. .............. 703/27 |
| 7,430,187 | B2 * | 9/2008 | Holt et al. ................ 370/329 |
| 7,539,175 | B2 * | 5/2009 | White et al. .............. 370/350 |
| 7,970,910 | B2 * | 6/2011 | Choi et al. ................ 709/227 |
| 2002/0099854 | A1 * | 7/2002 | Jorgensen ................ 709/249 |
| 2003/0028598 | A1 * | 2/2003 | Moller et al. ............. 709/205 |
| 2003/0081547 | A1 * | 5/2003 | Ho .......................... 370/229 |
| 2003/0172114 | A1 * | 9/2003 | Leung ..................... 709/205 |
| 2004/0090924 | A1 * | 5/2004 | Giaimo et al. ............. 370/252 |
| 2004/0218606 | A1 * | 11/2004 | Leatherbury et al. ...... 370/395.5 |
| 2004/0236856 | A1 * | 11/2004 | Keohane et al. ........... 709/229 |
| 2004/0249965 | A1 * | 12/2004 | Huggins et al. ............ 709/231 |
| 2005/0091683 | A1 * | 4/2005 | Sheynman et al. .......... 725/34 |
| 2005/0100022 | A1 * | 5/2005 | Ramprashad ........... 370/395.42 |
| 2005/0207433 | A1 * | 9/2005 | Ni .......................... 370/401 |
| 2007/0070888 | A1 * | 3/2007 | Raman et al. ............. 370/229 |
| 2007/0121534 | A1 * | 5/2007 | James et al. .............. 370/313 |
| 2007/0195818 | A1 * | 8/2007 | Stephenson et al. ........ 370/468 |
| 2008/0123543 | A1 * | 5/2008 | Do et al. .................. 370/252 |
| 2008/0209486 | A1 * | 8/2008 | Casaos .................... 725/109 |
| 2008/0229365 | A1 * | 9/2008 | Kim et al. ................ 725/56 |
| 2009/0161688 | A1 * | 6/2009 | Park et al. ................ 370/441 |

* cited by examiner

Primary Examiner — Alpus H Hsu
Assistant Examiner — Hooman Houshmand

(57) ABSTRACT

The use of broadcast channels for television programming on a wireless telecommunications data network is optimized. Proxy servers at base stations receive more programming than can be broadcast by the base station. Programming then is queued for changes in broadcast content. Management servers coordinate the broadcasts across multiple sectors so that centralized control is possible. Management servers operate in conjunction with necessary gateways on the connectivity services network to route content to access service network. Quality of service (QoS) guarantees are actualized by centrally managing the broadcast of requested content from the proxy servers. Handoffs are possible from one area to another by coordinating the broadcasts across access service networks.

20 Claims, 5 Drawing Sheets

BROADCAST SERVICE CHANNEL OPTIMIZATION FOR TV SERVICES

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

The present invention is defined by the claims below, but summarily, embodiments of the present invention provide for methods, media, and systems for optimizing the use of broadcast channels for television programming on a wireless telecommunications data network. Using proxy servers at base stations, more programming than can be broadcast by a base station is queued for quick and efficient changes in broadcast content. A management server coordinates the broadcasts across multiple access networks so that centralized control is possible. The management server operates in conjunction with necessary gateways to effectively route content to access networks. The present invention has several practical applications in the technical arts. Networks with bandwidth constraints, such as those using wireless microwave access, can be more flexible in delivering content to users. Quality of service (QoS) guarantees may be more easily actualized by prioritizing requests and quickly broadcasting requested content. By coordinating broadcasts in multiple areas, seamless handoffs are possible from one area to another.

In a first aspect, computer-readable media having computer-usable instructions perform a method of optimizing a broadcast of streaming media content in a bandwidth-constrained network. The network includes a plurality of broadcast base stations, each including a media proxy server and a base-station controller. An application server communicates streaming media content to the media proxy servers, which are capable of receiving more streaming media content than its respective base station can broadcast. At a first base station, a user request to broadcast streaming media content is received. If bandwidth is available, the user request is communicated from a base-station controller to a media proxy server and the instance is broadcast from the first base station. If bandwidth is not available at the first base station, the request to broadcast the instance of streaming media content is denied. Information about the user request, the availability of bandwidth, and the streaming media content is transmitted to a broadcast-management server (BMS) and subsequent requests and broadcasts are managed utilizing the BMS.

In a second aspect, computer-readable media having computer-usable instructions to increase the efficiency of broadcasting television content from a base station. The base station includes a base-station controller and a video media proxy (VMP) server. Streaming television content is received at the VMP server, which is capable of receiving more content than may be broadcast from the base station. A user request for desired television content received. After determining whether bandwidth is available at the base station to satisfy the user request, either the desired television content is broadcast, or the request is denied. Data associated with the request, bandwidth allocation, and broadcast are sent to a broadcast-management server.

In a third aspect, a system is provided for enhancing the availability and delivery of television content in a data network that utilizes wireless microwave access. The system includes one or more video media proxy (VMP) servers. Each VMP server is associated with a base station operating on the data network. The system also includes one or more broadcast-management servers that can communicate with the VMP servers. The broadcast-management servers send and receive data regarding requests for television content, bandwidth availability, and streaming instances of television content as a means of managing the broadcast of television content at the base stations.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
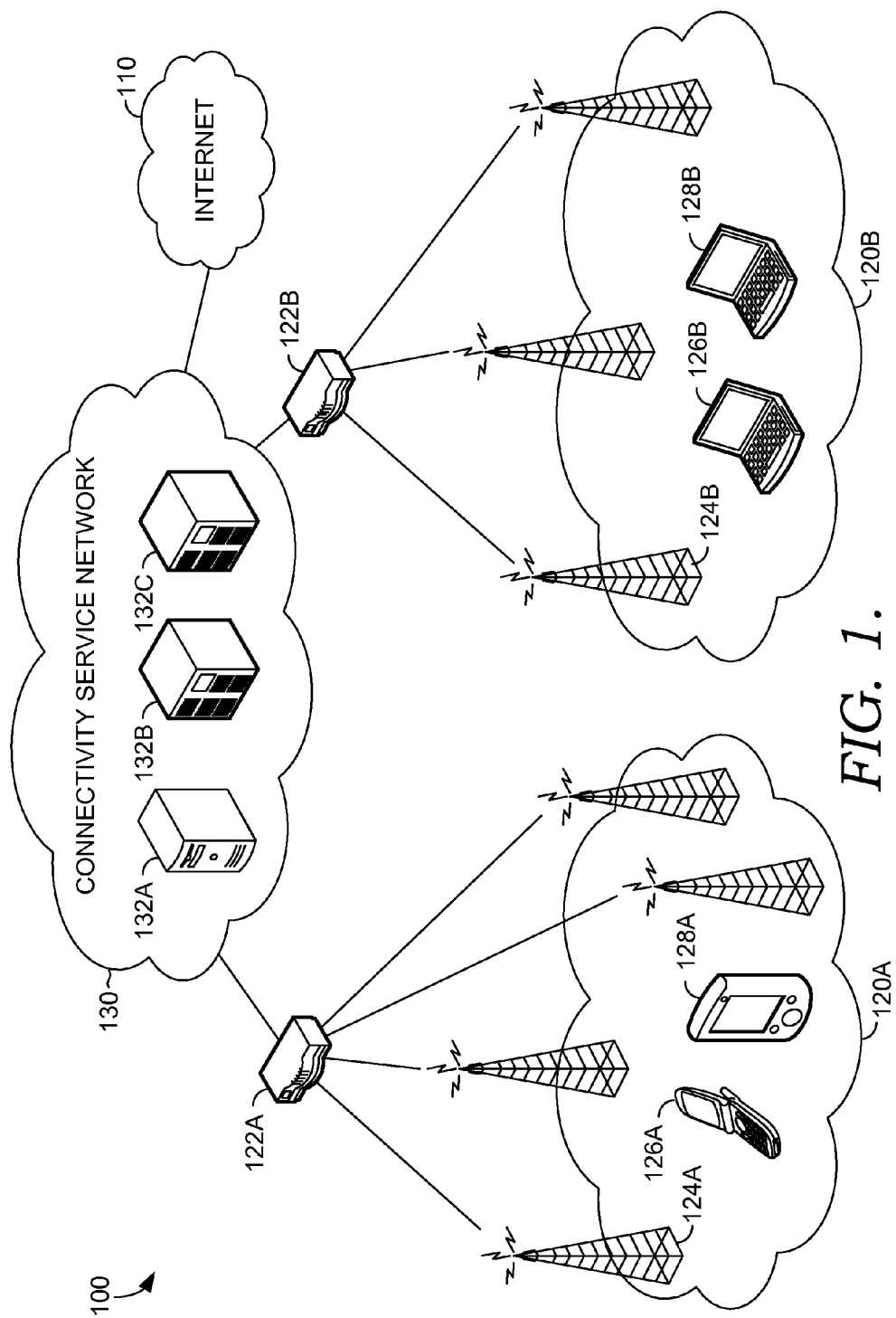
FIG. 1 is a simplified view of an exemplary wireless telecommunications environment suitable for practicing an embodiment of the present invention.

Embodiments of the present invention provide systems, media, and methods for optimizing the use of broadcast channels for television programming on a wireless data network. Proxy servers at wireless network base stations can receive more programming than can be broadcast. Streaming media is queued for quick and efficient changes in broadcasted content. Additionally, devices can coordinate the broadcasts across multiple access networks so that centralized control is possible. A management server operates in conjunction with necessary gateways to effectively route content to access networks and to prioritize requests.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

ASN Access Service Network
BMS Broadcast-Management Server
BS Base Station
BSC Base Station Controller CSN Connectivity Service Network
GW Gateway
IP Internet Protocol
MMG Multi-Media Gateway
SOFDMA Scalable Orthogonal Frequency Division Multiple Access
VMP Video Media Proxy
WiMAX™ Wireless Microwave Access Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In the figures and succeeding descriptions, like numbering will be used where possible. FIG. 1 depicts an illustrative environment 100 suitable for operating a wireless telecommunications network. Environment 100 is meant to be illustrative in nature and should not be construed as limiting the scope of the invention to the specific configurations or quantities of components shown. Environment 100 is depicted as two types of non-distinct networks, a connectivity service network 130 and two access service networks 120A and 120B. Other embodiments of the present invention may have more than one connectivity service network 130. Similarly, embodiments may and likely will have more than two access service networks. Only two have been depicted for the sake of clarity. The division of the two types of networks again is for illustrative purposes only and there can be overlap in equipment and function between the CSN and ASNs. Finally, CSN 130 is connected to an internet connection 110 in order to provide world wide web connectivity to the devices of CSN 130 and ASNs 120A and 120B.

Connectivity service network 130 is depicted with a plurality of servers 132A, 132B, and 132C. While server 132A appears different from servers 132B and 132C, this is again merely for illustration. Three servers are illustratively shown, but of course more or less can be employed. All may be of similar types or some might be different in function and operation. Some computing devices on CSN 130 need not be servers at all, but may be other sorts of computing devices, such as gateways, gateway controllers, routers, databases and the like. A basis for depicting connectivity service network 130 is to show a collection of servers and equipment that provide a common backbone for one or more access networks to communicate with a network provider and/or with other access networks. An access service network gateway 122A is shown connecting CSN 130 to access service network 120A, while a substantially similar ASN gateway 122B is shown to connect CSN 130 to ASN 120B. Again this is to show one environment in which a network may provide wireless access to users. Shown in ASN 120A is a base station 124A. There are three other base stations shown but not numbered for clarity. Also not shown or numbered are associated base station controllers and a variety of other components, which are perform a number of functions for associated base stations by allocating bandwidth, routing connections, and converting signals, along with multiple other tasks.

A first wireless access device 126A and a second wireless access device 128A also are depicted in ASN 120A. While access device 126A is shown as a cellular telephone and access device 128A is shown as a hybrid phone and personal data assistant (PDA) unit. Neither device is selected to limit the types of devices that may operate in ASN 120A. In fact, conventional PDAs, laptops, and personal computers could all use ASN 120A. Access service network 120A is not intended to be limited to two devices or four base stations. ASN 120B shows two laptop computers, which are numbered 126B and 128B. Both can send and receive wireless communications from base station 124B, or from a substantially similar one. Again, several base stations are depicted but not numbered for illustration. ASNs 120A and 120B are not meant to require any particular wireless network protocol, but may use a number of different signaling means. One example is scalable orthogonal frequency division multiple access (SOFDMA) protocol, which could be used in a microwave access setting. This example may be compatible with various standards-based networks, as exemplified by a WiMAX™ compliant network. This should be understood as a network and devices meeting the promulgated standards of the WiMAX Forum® administered in Beaverton, Oreg. However, this should not be construed as a limitation of the claimed embodiments of the present invention.

Figure 2:
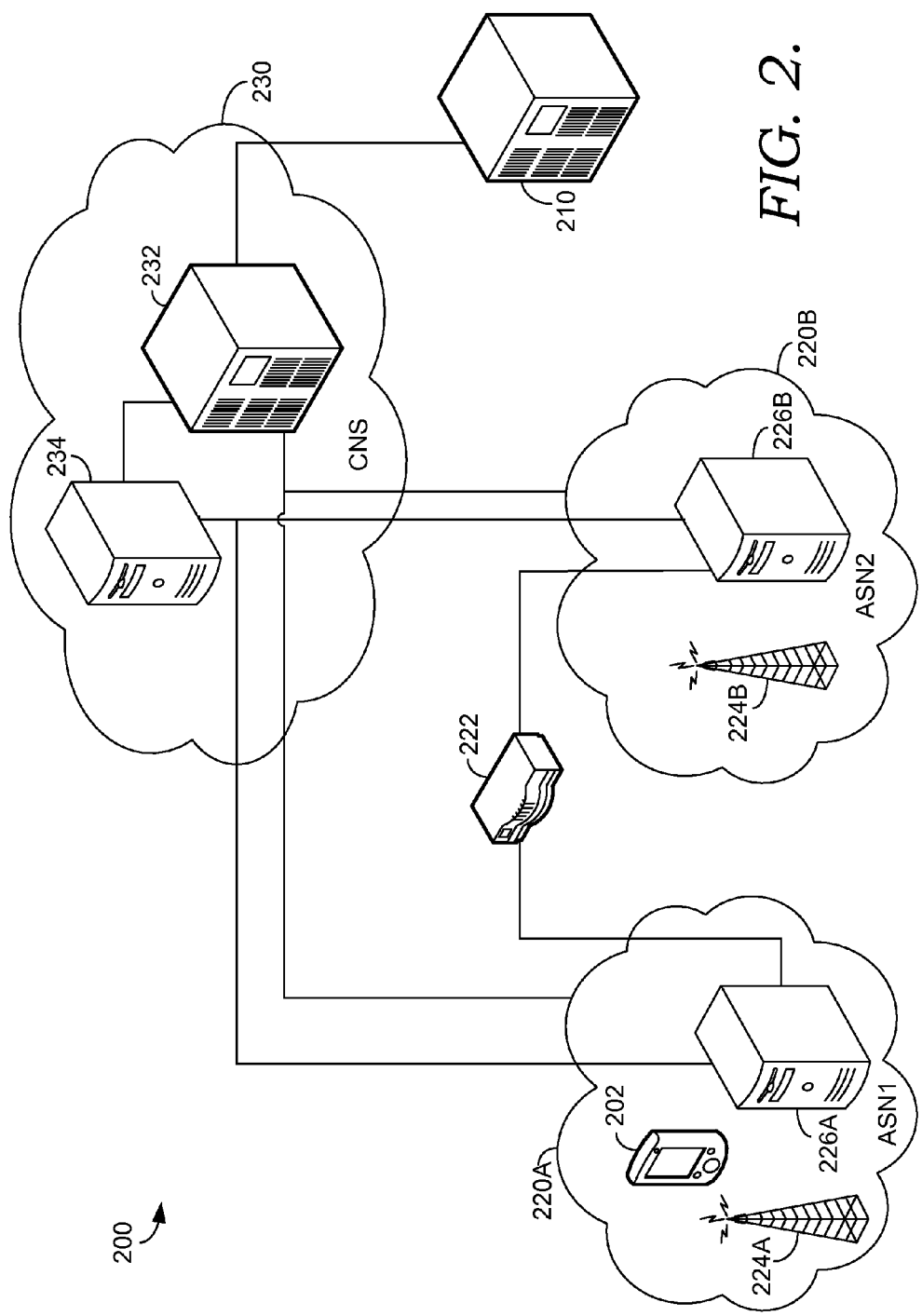
FIG. 2 is a simplified view of an exemplary wireless telecommunications environment suitable for practicing an embodiment of the present invention.

Turning now to FIG. 2, a simplified view of an environment 200 in which a telecommunications data network can utilize wireless microwave access is depicted. It should be noted that an access service network 220A and an access service network 220B are shown that substantially correspond to ASNs 120A and 120B of the previous figure, as does a connectivity services network 230 to CSN 130. As part of its connectivity to the internet, CSN 230 is depicted with a logical connection to a streaming server 210. Alternatively, streaming server 210 can be referred to as an application server or a content source. It is contemplated within the scope of the present invention that streaming server 210 could be a streaming video server providing video content. Even more specifically, streaming server 210 could be an application server that streams live or recorded television content to the Internet.

Streaming server 210 is logically coupled to CNS 230 by way of a multi-media gateway (MMG) 232. Generically, a multi-media gateway is a computing device enabling, among other things, communication between devices on different types of networks or using different signaling protocols. In the exemplary case, MMG 232 allows streaming video server 210 to transmit video content to a network that uses a different signaling protocol. For example, if streaming video server 210 uses Internet Protocol (IP) and ASN 220A uses a protocol such as SOFDMA, the multi-media gateway 232 converts from one protocol to the other as necessary. After converting the signals to a useable form, MMG 232 then sends the instance of streaming media content to an access services network device, such as one found at ASN 220A or 220B. The direct connection shown between MMG 232 and ASNs 200A and 200B should not be construed as a direct connection or without devices between the two. To the contrary, there likely are intermediary devices that route signals from MMG 232 to a ASN. The solid lines are meant to establish only that the flow of communicated streaming media can pass through MMG 232 and reach ASN 220A or 220B.

Also shown in FIG. 2 is a broadcast-management server (BMS) 234, which is logically coupled to multi-media gateway 232 and to devices located on ASNs 220A and 220B. Broadcast-management server 232 can be seen as a central controller for all of the broadcasts on connected access service networks. BMS 234 processes the instances of streaming content that are being sent to access service networks, as well as the requests that are received to broadcast streaming content. In addition to collecting information, BMS 234 acts as a decision-making processor that manages resources for competing requests of bandwidth allocation in access service networks. For all ASNs connected with CSN 230, the BMS will coordinate broadcasting channels and instances of streaming media.

Several examples will be given, but none are meant to limit the scope of the present invention. One way that bandwidth allocation can be managed by BMS 234 is by using the number of current users of broadcast channels. Channels with the greatest numbers of users will continue to broadcast that instance of streaming media. For example, consider a bandwidth allocation of 40 Megahertz (MHz), where 4 MHz is required to broadcast a television signal. Intuitively, 10 channels are available for television broadcasts. Nine channels have multiple users and one channel has a single user. If two users simultaneously request an 11th instance, the channel with the single user may be no longer broadcast the previously requested instance so that more users are accommodated. Another management method is the use of connection duration. If two users are each watching a different instance, and one must be disconnected to broadcast another requested instance, the user watching the longest time may keep his or her broadcast channel for his or her instance of programming.

Another management example is through the use of Quality of Service (QoS) guarantees. An exemplary case may be a user who pays a higher price for guaranteed connectivity. In this instance, if the higher-priority user requests an instance, a single lower-priority user may be disconnected to give the a higher priority user a broadcast channel. The higher-priority user may even displace multiple lower-priority users as determined by BMS 234. In another example, if a user is moving, BMS 234 may monitor the movement. If the user nears the edge of one access service network, BMS 234 may alert devices in the adjacent ASN to prepare a channel for a seamless handoff. In this case, the handoff may depend on previously mentioned factors, such as volume, viewing length and QoS guarantees.

Continuing with FIG. 2, BMS 234 is connected to ASNs 220A and 220B through video media proxy (VMP) servers 226A and 226B, respectively. The purpose of video media proxy server 226A is to "queue" instances of streaming media for access services network base station 224A. VMP server 226B serves the same function for base station 224B as would any VMP server for its associated base station. Application server 210 is able to stream more instances of streaming media content to a VMP server than its associated base station would be able to broadcast. As an example, a broadcast bandwidth may be allocated for 10 channels, but the VMP server could receive 100 instances. In this case, 90 instance could be queued for future use by other users when channels become available. Unlike bandwidth constraints of allocating channels for broadcast, VMP servers are only constrained by processing speed, memory space and the bandwidth available to the server (i.e. through a wired connection). Therefore, the ability to queue content depends on hardware, rather than constraints such as allocable bandwidth for over-the-air broadcasts. Rules for queuing instance so streaming media may be flexible. They could include frequently requested instances, recently requested streams, or providers who pay additional fees to ensure their streaming content is sent to VMP servers. These are merely intended as examples, however, and should not limit the types of decisioning that would determine the instances that are available at the VMP servers.

Figure 3:
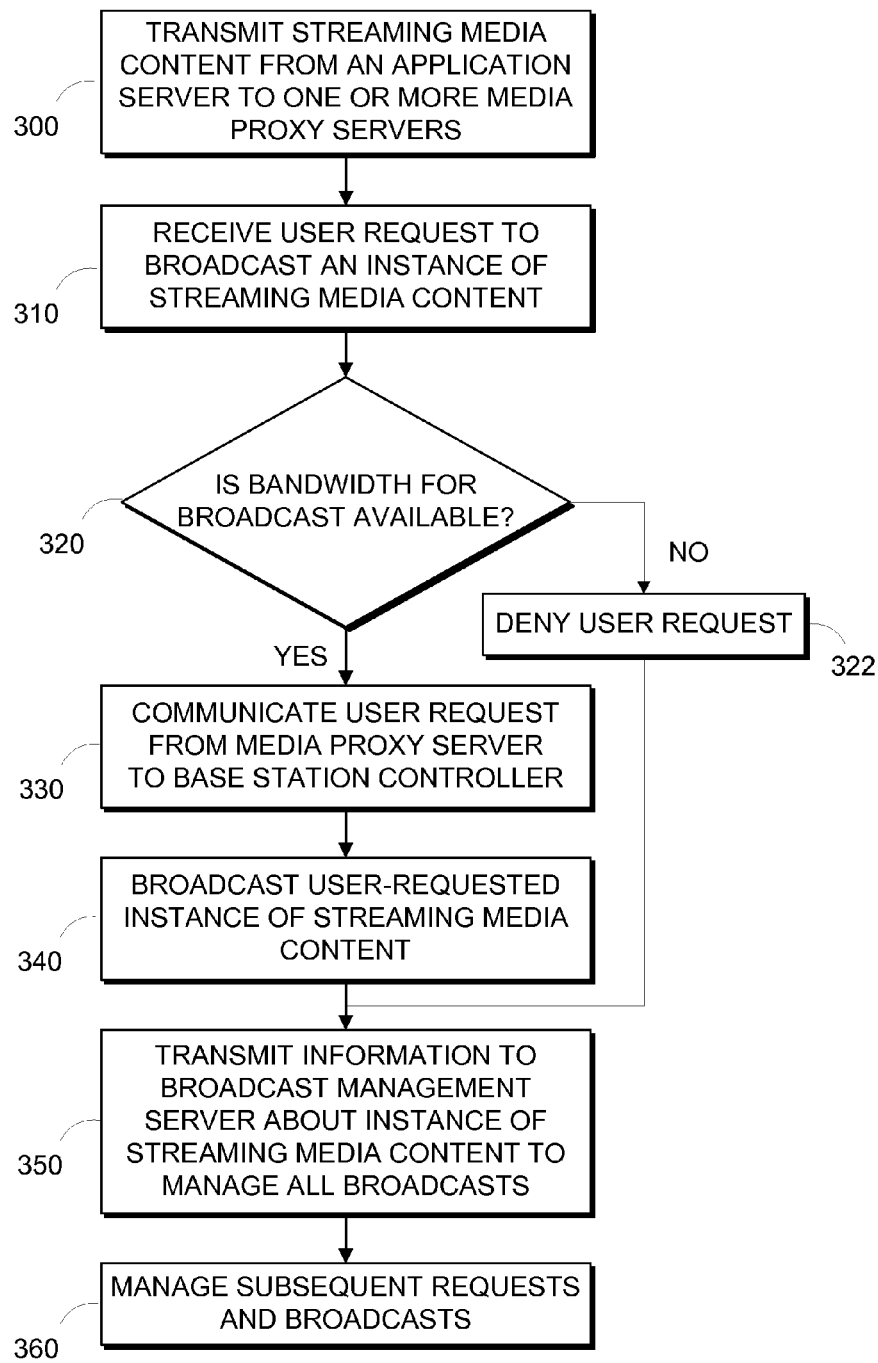
FIG. 3 is a flowchart of a method for broadcasting streaming media content on a telecommunications data network in accordance with an embodiment of the present invention.

Turning to FIG. 3, a flowchart of a method for broadcasting streaming media content on a telecommunications data network is shown. At a step 300, streaming media content is transmitted from an application server, such as streaming media server 210 depicted above, to one or more media proxy servers, e.g., VMP 226A of FIG. 2. The streaming media content could be any form of streaming media content suitable for broadcast. The application server is not constrained by a particular format or type of service. At a step 310, a user request is received at a media proxy server to broadcast an instance of media content. Again, the user request can be received from any suitable device that may receive streaming media content. Examples include video enabled phones, hybrid PDA-phone-style devices, or laptops. If bandwidth is available at a step 320, the request is communicated from VMP server 226A to the base station controller at a step 330. The bandwidth allocation should be determinable at the base station. Alternatively, the VMP server may be in communication with the broadcast-management server to determine and update the channel allocations in a virtually simultaneous fashion. At a step 340, the requested instance is broadcast. Otherwise, if bandwidth is not available at step 320, the request is denied at a step 322 and the method moves to a step 350. At step 350, information regarding the instance of streaming media and the request to broadcast it are sent to a broadcast-management server, such as BMS 234 depicted above. At a step 360, BMS 234 manages subsequent requests and broadcasts. One management method will be discussed in greater detail below with reference to FIG. 5.

Figure 4:
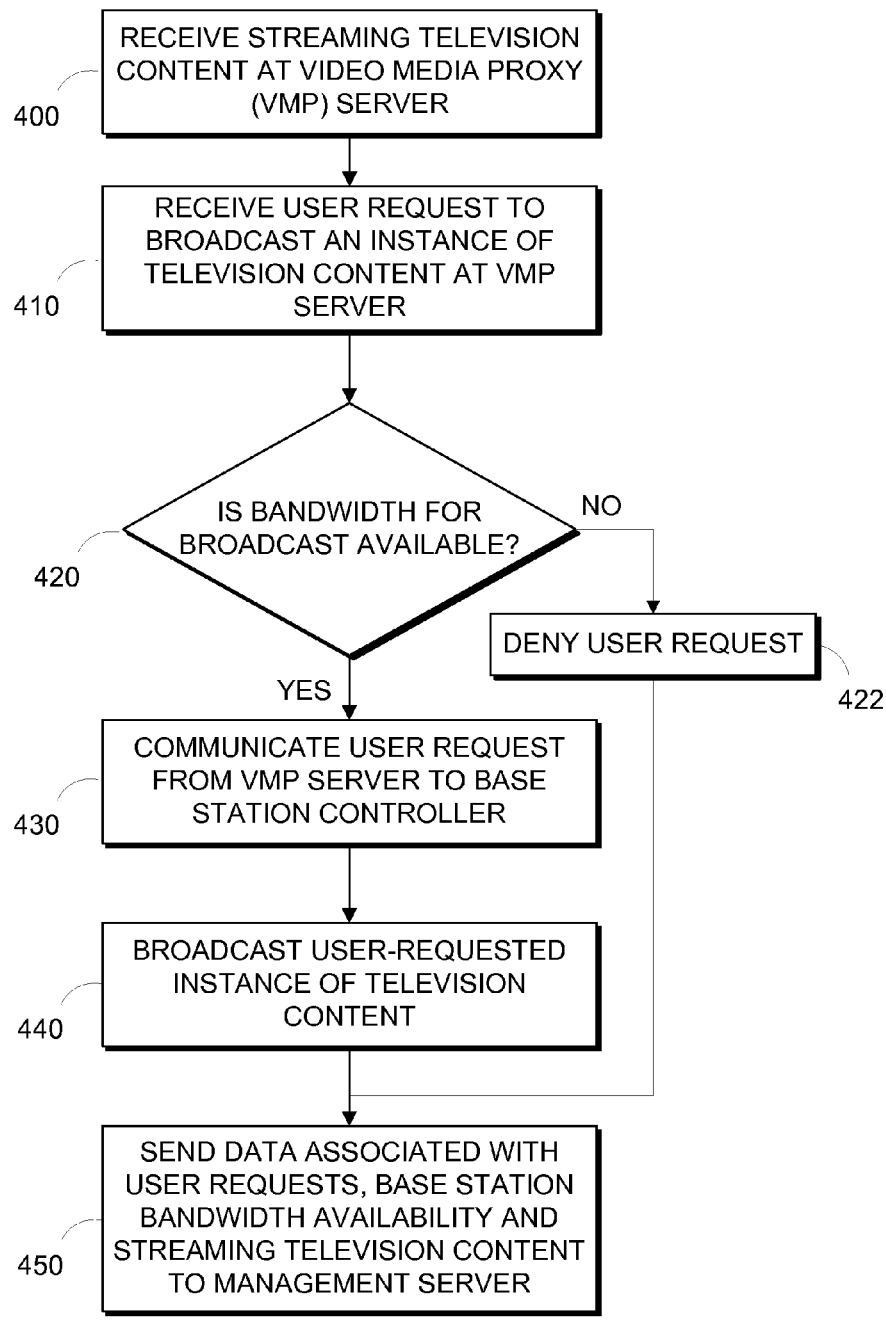
FIG. 4 is a flowchart of a method for broadcasting television programming on a telecommunications data network employing wireless microwave access in accordance with an embodiment of the present invention.

Depicted in FIG. 4 is a flowchart of a method for broadcasting television programming on a telecommunications data network employing wireless microwave access devices. This could be a network utilizing WiMAX™ compliant devices. At a step 400, streaming television content is received at a video media proxy server, such the device depicted in FIG. 2 by VMP server 226A. At a step 410, a request from a user, such as one using device 202, is received. The request is to broadcast an instance of television programming or content. A determination is made at a step 420 on whether or not bandwidth is available for broadcasting. If bandwidth is available, the request is communicated from VMP server 226A to the base station's controller at a step 430 and the user-requested instance is broadcast at a step 440. If bandwidth is not available, the user request is denied at a step 422. Whether the request is denied or broadcast, data associated with the request, available bandwidth, and streaming television content are sent to a broadcast-management server. The data can be sent to a server as depicted in FIG. 2 as BMS 234.

Figure 5:
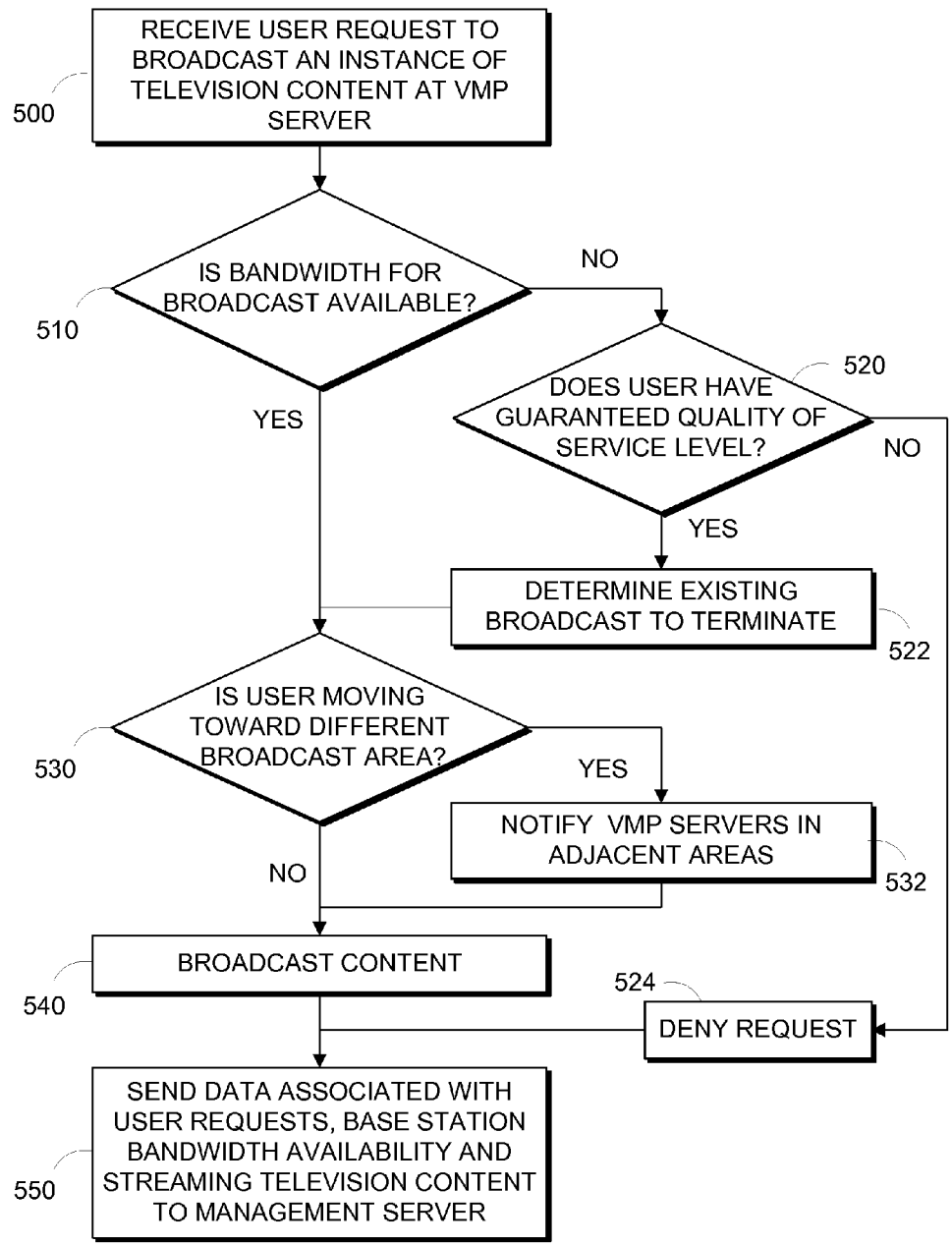
FIG. 5 is a flowchart of a method for managing user requests for television broadcasts on a telecommunications data network utilizing wireless microwave access in accordance with an embodiment of the present invention.

Both the method of FIG. 3 and FIG. 4 are simplified methods for broadcasting and coordinating media content, as both refuse to broadcast content if bandwidth is not available. FIG. 5 shows a flowchart of a more complex method for managing user requests for television broadcasts that does not strictly deny requests when bandwidth availability is an issue. At a step 500, user requests are received to broadcast an instance of television content at VMP server 226A, similar to methods discussed previously. As mentioned previously, a determination can be made locally whether or not bandwidth is currently available to devote to the broadcast channel, as show at a step 510. The allocation determination could be by BMS 234 in the alternative.

Rather than immediately deny the request if bandwidth is not available, however, Quality of Service (QoS) guarantees are checked at a step 520. If there is no such guarantee, the method proceeds to a step 524 where the request is denied as seen above. If there is a QoS guarantee, though, the level of that guarantee must be checked and additional processes completed. The QoS for a request may be linked to the user that is making the request, or it may be associated with the device that is in use. When QoS levels necessitate that bandwidth be available for the user, a step 522 is used to determine which existing broadcasting channel must be reallocated to accommodate the request. Again, the determination of which instance to terminate may be dependent on the number of users which already have instances initiated, the duration of previously requested broadcasts, or a host of other previously established rules for guaranteeing the QoS level.

After determining QoS level (or lack thereof), a determination is made to see if the user is moving toward a different broadcast area at a step 530. If the user is moving toward a different area, which may alternatively be called a sector, then VMP servers in the adjacent areas may be notified of the impending arrival at a step 532. This allows the VMP servers in adjacent areas to queue the streaming media content viewed by the user, even if it is not currently being broadcast or queued in that area. Optionally, if the VMP server has the processing ability to queue the content regardless of the user's movement, then all adjacent VMP servers could receive the content. Only once the VMP server is nearing capacity or has reached capacity does this become an issue.

As an example, if one sector has eight adjacent sectors surrounding it, there may be one VMP server in each of the eight sectors. Each of these adjacent sectors may also have eight adjacent sectors. In one exemplary case, if each VMP server can receive 100 instances of streaming content, and each base station can broadcast 10 channels, then each adjacent VMP will not exceed 80 instances of streaming media. However, if a VMP server can only receive 50 instances, then the number of adjacent broadcasts could exceed that VMP server's capacity to receive and queue all 80. In the latter example, it may be possible to queue for first 30 channels, but to implement a movement rule once that channel-usage threshold has been met. Once 30 instances are allocated, then only those adjacent broadcasts which are known to have moving users will be queued. Likewise, once 40 instances are queued, only those broadcasts with users very near the adjacent area may be broadcast. An alternative may be to queue only those moving toward the adjacent sector as opposed to those moving in a direction parallel or away from the sector. Once again, any specific rules may be used and this is not intended to convey a limitation to the claimed embodiments of the present invention.

Returning to FIG. 5 at a step 540, the content is broadcast. At a step 550, data associated with the user requests, base station bandwidth allocations and streaming television content is sent to a broadcast-management server, such as BMS 234. Whether the instance has been broadcast from step 540 or the request has been denied from step 524, the necessary management information is sent at step 550. This allows the BMS to continually manage the allocation of bandwidth in all areas or sectors through a centrally controlled process, coordinated with VMP servers.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-usable instructions embodied thereon for performing a method of optimizing a broadcast of streaming media content in a bandwidth-constrained network, wherein the network includes a plurality of broadcast base stations, wherein each broadcast base station includes a media-proxy server and a base-station controller, the method comprising:

communicating streaming media content from an application server to the plurality of media-proxy servers, wherein each media-proxy server is capable of receiving more instances of streaming media content than its respective broadcast base station is capable of broadcasting;

at a first base station that includes a first media-proxy server, receiving from a wireless user device a user request associated with a user to broadcast a new instance of streaming media content that requires additional bandwidth;

determining whether bandwidth is available at the first base station to broadcast the new instance of streaming media content;

when bandwidth is available at the first base station, communicating the user request from a first base-station controller to the first media-proxy server to broadcast the new instance of streaming media content, and broadcasting the new instance of streaming media content from the first base station;

when bandwidth is not available at the first base station, denying the request to broadcast the new instance of streaming media content;

transmitting information about the user request, the availability of bandwidth, and the streaming media content to a broadcast-management server (BMS), wherein the BMS coordinates broadcasts across multiple access networks;

utilizing the BMS to centrally manage requests and broadcasts on the multiple access networks, wherein managing requests and broadcasts includes, A) when the request to broadcast the new instance of streaming media content is denied at the first base station, then determining whether a Quality of Service (QoS) guarantee requires bandwidth to be available for the user request, B) when bandwidth is required to be available for the user request, then
  i) determining an existing broadcasting channel to be reallocated to accommodate the user request, wherein the existing broadcast channel is currently being used to transmit a second instance of streaming media content to a second user,
  ii) terminating the second instance that is being transmitting to the second user, and
  iii) reallocating the existing broadcast channel to accommodate the user request.

2. The media of claim 1, wherein the network is a data network utilizing wireless microwave access.

3. The media of claim 2, wherein the streaming media content is television programming.

4. The media of claim 3, wherein managing includes determining the total number of users receiving each broadcast channel to determine if bandwidth should be allocated for a subsequent request of new content.

5. The media of claim 4, wherein managing further includes:
determining guaranteed quality of service (QoS) levels for users requesting television programming;
allocating bandwidth for subsequent requests based on QoS levels.

6. The media of claim 5, wherein managing further includes:
determining if users who are receiving television programming are moving toward an adjacent area serviced by a different base station; and
if bandwidth is available at the different base station, broadcasting the television programming from the different base station prior to the user entering the adjacent area.

7. One or more nontransitory computer-readable media having computer-usable instructions embodied thereon for performing a method of increasing an efficiency of broadcasting television content from a base station, wherein the base station includes a base-station controller and a video-media-proxy (VMP) server, the method comprising:
at the VMP server, receiving streaming-television content, wherein the VMP server is capable of receiving an amount of streaming-television content that is greater than an amount of bandwidth available at the base station for television broadcasting;
at the base station, receiving from a wireless user device a user request for desired television content that requires additional bandwidth to broadcast;
at the base station, determining whether bandwidth is available to satisfy said user request for the desired television content that requires additional bandwidth to broadcast;
at the base station, if bandwidth is available, then broadcasting the desired television content;
at the base station, if bandwidth is not available, then denying the request; and
sending data associated with the user request, bandwidth allocation, and broadcast from the base station to a broadcast-management server (BMS), wherein the BMS coordinates broadcasts across multiple access networks, wherein when bandwidth is not available, the BMS disconnects a second user that is receiving streaming media content on an existing broadcast channel and reallocates the existing broadcast channel to accommodate the user request.

8. The media of claim 7, wherein the base station is part of a data network utilizing wireless microwave access.

9. The media of claim 7, wherein the data network is divided into a connectivity service network and one or more access service networks.

10. The media of claim 9, wherein the connectivity service network includes the broadcast-management server and one or more multi-media gateways.

11. The media of claim 10, wherein the broadcast-management server is logically connected to a multi-media gateway.

12. The media of claim 9, wherein each of the access service networks are connected to adjacent access service networks by access service network gateways.

13. The media of claim 7, wherein one or more video streaming servers provide the television content.

14. The media of claim 13, wherein the one or more video streaming servers send the television content to the VMP servers via a multi-media gateway.

15. A system for enhancing the availability and delivery of television content in a data network that utilizes wireless microwave access, the system comprising:
a plurality of video media proxy (VMP) servers, wherein each VMP server is associated with a base station operating on the data network; and
a broadcast-management server that communicates with the VMP servers, wherein the broadcast-management server sends and receives data regarding requests for television content, bandwidth availability, and streaming instances of television content,
and wherein the broadcast-management server centrally manages the broadcast of television content at the base stations, wherein managing the broadcast of television content includes
  A) determining whether bandwidth should be reallocated to accommodate a request for television content,
  B) when bandwidth should be reallocated, selecting an instance of streaming television content in an existing broadcast channel to terminate,
  C) terminating the instance of streaming television content, and
  D) reallocating the existing broadcast channel to accommodate the request for television content.

16. The system of claim 15, wherein the plurality of VMP servers receive television content from a multi-media gateway.

17. The system of claim 16, wherein the broadcast-management server is logically connected to the multi-media gateway.

18. The system of claim 15, wherein each VMP server is logically connected to an adjacent VMP server via an access service network gateway.

19. The system of claim 18, wherein each access service network gateway provides a handoff from a first VMP server to a second VMP server in an adjacent area when the user moves from a first area to the adjacent area and bandwidth is available in the adjacent area.

20. The system of claim 15, wherein each VMP server is logically connected to a base-station controller utilized for controlling the base station with which the VMP server is associated.

* * * * *